March 7, 1939.  W. GEYGER  2,149,256

ARRANGEMENT FOR MEASURING THE LOSSES IN CONDENSERLIKE OBJECTS

Filed Aug. 9, 1937  4 Sheets-Sheet 1

Wilhelm Geyger
Inventor
by Knight
Attys.

March 7, 1939.   W. GEYGER   2,149,256
ARRANGEMENT FOR MEASURING THE LOSSES IN CONDENSERLIKE OBJECTS
Filed Aug. 9, 1937   4 Sheets-Sheet 2

Wilhelm Geyger
Inventor
by Knight
Atty.

March 7, 1939.  W. GEYGER  2,149,256

ARRANGEMENT FOR MEASURING THE LOSSES IN CONDENSERLIKE OBJECTS

Filed Aug. 9, 1937  4 Sheets—Sheet 4

Patented Mar. 7, 1939

2,149,256

UNITED STATES PATENT OFFICE 2,149,256

ARRANGEMENT FOR MEASURING THE LOSSES IN CONDENSERLIKE OBJECTS

Wilhelm Geyger, Berlin-Schmargendorf, Germany, assignor to Siemens & Halske, Aktiengesellschaft, Siemensstadt, near Berlin, Germany, a corporation of Germany Application August 9, 1937, Serial No. 158,157
In Germany August 24, 1936

8 Claims. (Cl. 175—183)

My invention relates to an arrangement for measuring the losses in condenser-like objects with the aid of a measuring bridge.

It is well known in the art to employ a bridge connection, which contains in one branch the condenser to be measured and in an adjacent branch the standard condenser, for measuring the losses in condenser-like objects, for instance, for testing the insulation of high-voltage cables or any other kind of device involving a dielectric. To this end, the known condenser measuring bridge of the Schering type has proved particularly suitable. In the Schering-bridge the other two bridge branches consist of ohmic resistances and the balance is effected on the one hand by means of an ohmic resistance and on the other hand by means of a regulable decade condenser parallel-connected to the bridge branch resistance opposite in the bridge connection to the condenser to be measured.

As is well known the zero balance in complex compensators and bridge connections may be effected in a simpler, easier and quicker manner, if the balancing means are uniformly variable. However, it is not possible to construct a uniformly variable condenser in which the maximum value of the capacity has the magnitude of 1μF corresponding to a loss factor of $tg\delta=0.1$ and necessary for the Schering-bridge. On the other hand, bridge connections have been proposed for such purposes in which the balance is only effected with the aid of ohmic resistances; however, such connections have not proved satisfactory owing to various other drawbacks. The balance by regulable ohmic resistances is of particular importance if the bridge is to be provided with a device for the automatic balance by two separately excited induction-counter measuring mechanisms (so-called zero motors) acting at the same time as phase-responsive zero indicators and reversing motors.

In this case the balancing resistors may be designed in the form of regulable potentiometer resistors, each tap contact being controlled by a zero motor. In this manner, a continuous and automatic indication or recording of the loss factor and, if desired, also of the capacity of the object to be measured is possible.

An arrangement for measuring the capacity and the loss factor of condenser-like objects by means of a condenser-bridge connection with automatic balance by means of zero motors has already been proposed, the balancing resistor serving to measure the losses being directly arranged in the bridge branch including the standard condenser. However, this known connection can only be employed if the standard condenser free of losses has a high capacity, i. e., a capacity of the order of 1μF, for only in this case is it possible to impart a sufficiently great loss angle value to the branch of the standard condenser with the aid of a rheostat of the order of 100 ohms. In practical cases where high voltages are, as a rule, involved, the standard condenser has, however, a capacity which is smaller by many orders of magnitude. Consequently, the resistance of the rheostat should amount to some megohms.

To remove these difficulties it has been proposed to connect the standard condenser and the bridge resistor lying in the adjacent branch to the secondary winding of a voltage transformer, whose primary winding is connected to the supply voltage. This arrangement may be satisfactory in some cases; it has, however, the disadvantage in that a precision voltage transformer rated for the full operating voltage is necessary, whose loss angle influences the measurement when determining the losses. Such a transformer assumes large dimensions and is very expensive owing to the requirements as to the accuracy of the measurement and owing to the very high voltages up to 500 kv. necessary in this case.

Another bridge connection operating also with ohmic regulating resistances and in which a slide wire lying in a bridge branch is more or less bridged by a condenser of constant capacity presents the great disadvantage for many purposes in that the recorded values do not vary linearly as is generally required, but according to a quadratic function.

The object of my invention is, therefore, to provide an improved bridge connection in which the balance is effected with the aid of two regulable ohmic resistors and whereby the drawbacks of the arrangements hitherto employed for measuring the losses in condenser-like objects are avoided. This is accomplished according to the invention by inserting in the circuit of the standard condenser an auxiliary condenser to which one of the balancing resistors is connected through a transformer. The second balancing resistor may be connected to the circuit of the condenser to be measured.

My invention is illustrated diagrammatically in the accompanying drawings, in which Figs. 1, 3 and 5 represent circuit diagrams showing bridge connections embodying the invention.

Figure 1:
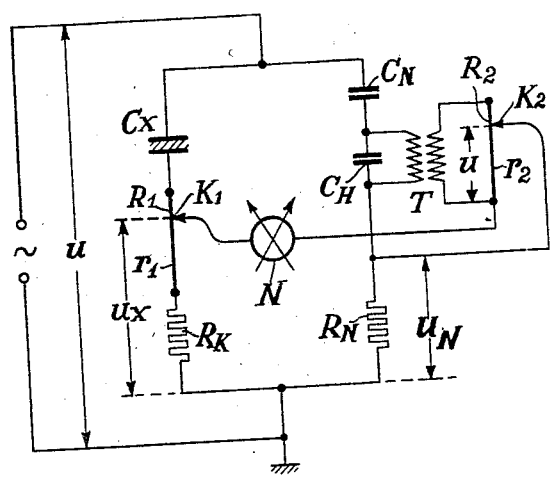

Referring first to the embodiment shown in the wiring diagram of Fig. 1, it is assumed here that a bridge connection is employed which contains, corresponding to the Schering-bridge, ohmic resistances in two adjacent bridge branches.

To an alternating-current source of the voltage U is connected a bridge connection which contains in one of its branches the capacity to be measured, shown here as a condenser $C_x$ in a second branch a standard condenser $C_N$ free of losses, in the branch opposite to the first branch an ohmic resistance $R_N$ and in the branch opposite to the second branch an ohmic resistance $R_K$. Both branches containing $C_x$ and $R_K$ are traversed when the bridge is balanced by a current $J_K$ and the other two by a current $J_N$.

In the branch of $C_N$ is inserted an auxiliary condenser $C_H$ to which is connected through a transformer T a potentiometer resistor $R_2$ designed as a slide wire whose effective resistance controlled by a tap contact $K_2$ is denoted by $r_2$. In this case it is assumed that the current flowing in the resistor $R_2$ is brought 90° out of phase by known means (not shown) with respect to the current $J_N$ flowing through the standard condenser $C_N$. In this case the capacity of the auxiliary condenser $C_H$ is preferably given such a high value as compared to the capacity $C_N$ of the standard condenser that the resistance of the balancing connection auxiliary condenser with the balancing connection connected thereto may be neglected with respect to the capacitive resistance of the standard condenser.

A similar potentiometer resistor $R_1$ whose effective resistance controlled by the corresponding contact $K_1$ is denoted by $r_1$ lies in the circuit of condenser $C_x$. A vibration galvanometer N serving as a zero instrument is connected on the one hand to the contact $K_1$ and on the other hand to one terminal of the resistor $r_2$.

Figure 2:
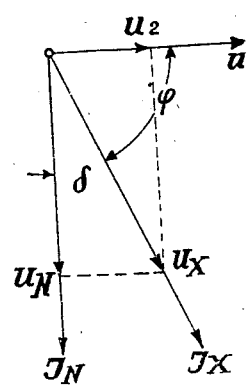
Fig. 2 represents a vector diagram showing the phase relations between the voltages and the currents in the circuit Fig. 1.

In Fig. 2 is shown the corresponding vector diagram. As will be seen from this figure the current $J_N$ leads the supply voltage U by 90°, whereas the current $J_x$ leads the voltage only by $\varphi = 90° - \delta$ owing to the loss angle $\delta$. The voltage $U_N = J_N.R_N$ is in phase with $J_N$. The voltage $U_2$ across the resistor $r_2$ is 90° out of phase with respect to the current $J_N$, that is in phase with U.

Consequently, the voltage $U_x = J_x.(R_K + r_1)$ is composed of the two voltage components $U_N$ and $U_2$. The current flowing in the resistor $r_2$ is evidently proportional to the current $J_N$ so that by omitting the proportional factor, $U_2 = J_N.r_2$. From the voltage triangle shown in Fig. 2 it results that $$tg\delta = \frac{U_2}{U_N} = \frac{J_N.R_2}{J_N.R_N} = \frac{R_2}{R_N}$$

However, since $R_N$ is constant the loss factor $tg\delta$ is proportional to $r_2$ and the displacement of the contact $K_2$ corresponds in linear proportion to the magnitude of the loss factor $tg\delta$.

However, it is, as a rule, preferable if both balancing resistors are connected to the circuit of the standard condenser. Also in this case both balancing resistors are preferably designed as potentiometer resistors and the variable portions thereof are series-connected in the diagonal branch of the bridge. Such embodiments are shown in Figs. 3 to 9.

Figure 3:
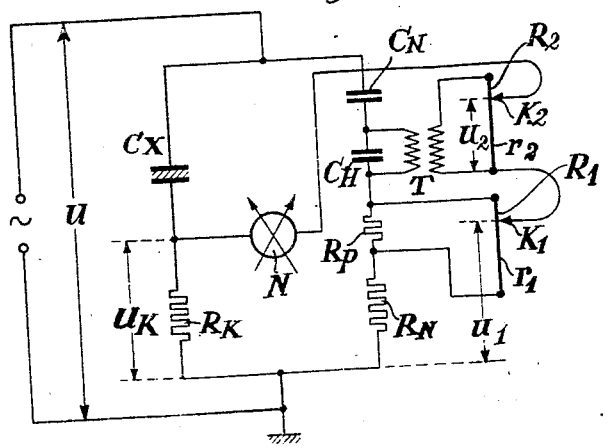

Fig. 3 shows a bridge connection embodying this feature, but arranged otherwise similar to that shown in Fig. 1. In the circuit of the standard condenser $C_N$ traversed by the current $J_N$ lies an auxiliary condenser $C_H$ to which is connected through a transformer T a slide wire $R_2$ in the same manner as in the connection according to Fig. 1, the variable portion of the slide wire being designated by the reference character $r_2$. In the same circuit of $C_N$ is inserted an ohmic resistor $R_P$ to which is connected a second ohmic resistor $R_1$ whose variable portion is designated slide wire $R_1$. The resistors $r_1$ and $r_2$ are series-connected by $r_1$. The resistors $r_1$ and $r_2$ are series-connected to the vibration galvanometer N in the diagonal branch. In this manner the voltage drop $$U_K = J_x.R_K$$

caused across the resistor $R_K$ by the current $J_x$ is balanced by two variable standard voltages $U_1$ and $U_2$ 90° out of phase. In this case the voltage $U_1$ is applied across the resistors $R_N$ and $r_1$ and the voltage $U_2$ across the resistor $r_2$.

Since the slide wire $R_1$ with the parallel resistor $R_P$ is series-connected to the resistor $R_N$, the current $J_1$ flowing in $R_1$ or the part voltage $U_1$ is in phase with the current $J_N$. Otherwise the connection with the auxiliary condenser $C_H$ is so rated that the current $J_2$ flowing in $R_2$ or the part voltage $U_2$ is 90° out of phase with respect to the current $J_N$. Also in this case $C_H$ is preferably so rated that the resistance of the balancing device may be disregarded as compared to the capacitive resistance of the standard condenser $C_N$. The part voltages $U_1$ and $U_2$ may be determined by the following equations:

$$U_1 = J_N.\left(R_N + \frac{r_1}{1 + R_1/R_P}\right) = U.\omega.C_N.\left(R_N + \frac{r_1}{1 + R_1/R_P}\right)$$

$$U_2 = const.J_N.r_2 = const.U.r_2$$

Figure 4:
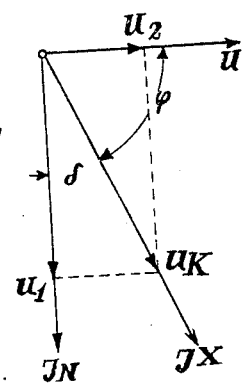
Fig. 4 represents a vector diagram showing the phase relations between the voltages and currents in the circuit Fig. 3.
Figure 5:
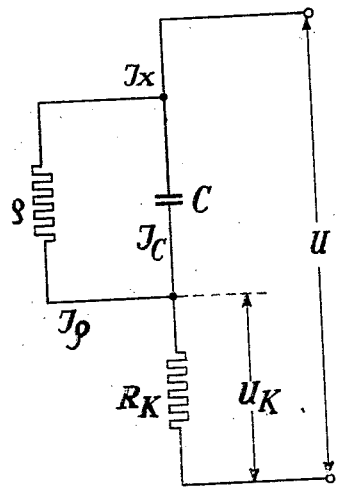
Figure 6:
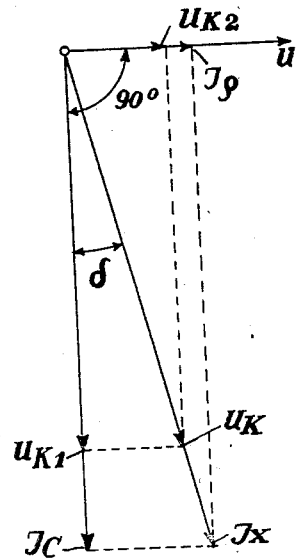
Fig. 6 represents a vector diagram showing the phase relations between the voltages and currents in the circuit Fig. 5.

Fig. 4 shows the corresponding vector diagram. Assuming that in the known connection according to Fig. 5 the condenser $C_x$ to be tested and having dielectric losses be replaced by a condenser C free of losses to which a resistor $\rho$ is parallel-connected, the diagram shown in Fig. 6 results, since $R_K$ may be neglected with respect to $1/\omega C$ and $\rho$, from which diagram the following equations may be derived:

$$U_{K1} = J_C.R_K = U.\omega.C.R_K$$

$$U_{K2} = J\rho.R_K = U.1/\rho.R_K$$

From the above equations it follows for $U_1 = U_{K1}$ and for $U_2 = U_{K2}$ that:

$$\text{Capacity } C = C_N.\frac{R_N + \frac{r_1}{1 + R_1/R_P}}{R_K}$$

variation of the capacity $\Delta C = const.r_1$ lead conductance $1/\rho = const.r_2$ $$\text{Loss factor } tg\delta = \frac{1}{\rho.\omega.C} = \frac{const.r_2}{R_N + \frac{r_1}{1 + R_1/R_P}}$$

and if $r_1/(1 + R_1/R_P)$ is very small as compared to $R_N$ loss factor $tg\delta = const.r_2$.

It, therefore, follows that the change in capacity $\Delta C$ is linearly recorded by the resistance $R_1$ and the loss factor $tg\delta$ by the resistance $r_2$.

Figure 7:
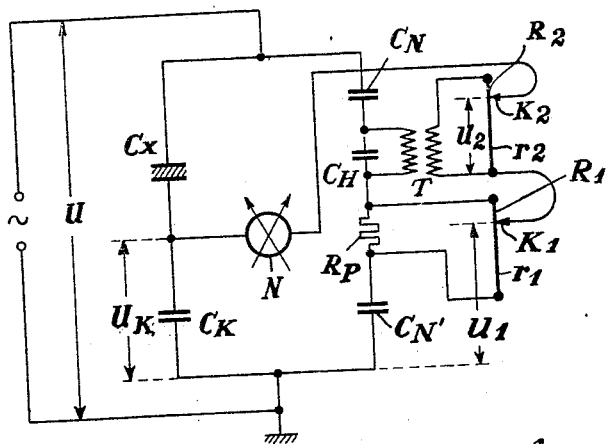
Fig. 7 represents a circuit diagram similar to Fig. 3 in which, however, condensers are inserted in all four bridge branches.

The invention is, however, also applicable to bridge connections of a different type. Thus, for instance, Fig. 7 shows a connection in which condensers are inserted in all four bridge branches. Otherwise the connection is similar to that shown in Fig. 3. However, in this case the phases are displaced 90° by the condensers $C_K$ and $C_N'$ substituted for the ohmic resistances $R_K$ and $R_N$. Consequently, the adjustment of the potentiometer contact $K_1$ is a measure for the loss factor $tg\delta$ and the adjustment of $K_2$ is a measure for the change in capacity $\Delta C$.

In such an arrangement in the circuit $J_N$ of which is inserted a condenser $C_N'$ besides the standard condenser $C_N$, the other two branches may also be formed by the correspondingly subdivided secondary winding of an inductive transformer connected to the supply voltage.

Figure 8:
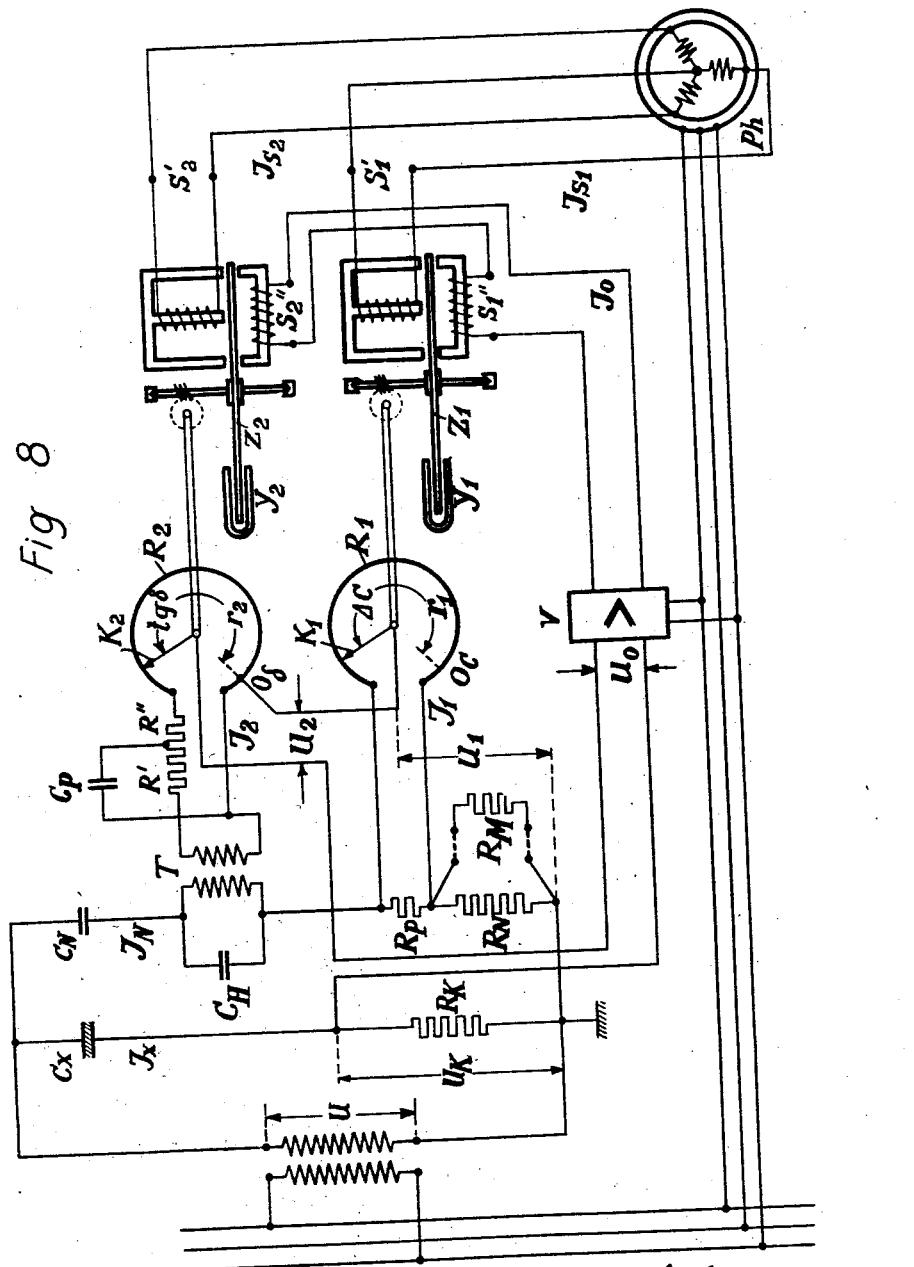
Fig. 8 represents a circuit diagram similar to Fig. 3, with an automatic balance by zero motors.

Fig. 8 shows an arrangement according to the invention with automatic balance by zero motors. In this case, it is assumed that a three-phase supply circuit be available to which the bridge connection is connected by means of a single phase high voltage transformer, the secondary voltage U acting as a supply voltage. The bridge connection proper is substantially designed in the form of a Schering-bridge similarly to the arrangement shown in Fig. 3 and also the other part of the connection corresponds substantially to that shown in Fig. 3. Similar parts are, therefore, also denoted in Fig. 8 by the same reference characters as in Fig. 3. Here is shown in a more exact manner how the voltage $U_2$ may be displaced exactly 90° out of phase with respect to $J_N$. To this end, a condenser $C_P$ is connected, for instance, through the resistor portion $R'$ to the secondary winding of the transformer T and the slide wire $R_2$ is connected through the resistor portion $R''$ to the condenser $C_P$. However, it is also possible to select any other known connection. The automatic balance of the bridge for deenergizing the zero branch is effected by two separately excited induction counter measuring mechanisms $S_1'$, $S_1''$, $Z_1$, $Y_1$ and $S_2'$, $S_2''$, $Z_2$, $Y_2$ acting at the same time as phase-responsive zero indicators and reversing motors and serving to control the slide contacts $K_1$, $K_2$. The voltage windings $S_1'$, $S_2'$ of the induction counter measuring mechanisms strongly attenuated by the brake magnets $Y_1$, $Y_2$ are separately excited by a rotating field phase regulator $Ph$ connected to the three-phase supply circuit with the aid of currents $J_{S1}$, $J_{S2}$ 90° out of phase. The current windings $S_1''$, $S_2''$ are series-arranged and connected to the zero branch through a tube amplifier V supplied with alternating current so that they are traversed by the output curent $J_0$ proportional to the input voltage $U_0$. Since in the case of a favorable and rapid phase adjustment of the exciting fields—representing both directional vectors—of these measuring mechanisms, an exact relationship exists between the direction of rotation of the armature discs $Z_1$ and $Z_2$ and the balancing direction necessary for both to move toward a balance, the slide contacts $K_1$, $K_2$ are always influenced according to the desired balancing adjustment.

In this case the corresponding speed of rotation of $Z_1$ and $Z_2$ is proportional to the corresponding departure from the state of balance. The more $K_1$ and $K_2$ approach the balancing position, the slower $Z_1$ and $Z_2$ will rotate; a hunting of the indicating members or recording pens (not shown) which may be coupled to $K_1$ and $K_2$ and serving to record the magnitude to be measured is, therefore, prevented.

Since the Schering-bridge with balance by hand has proved particularly suitable for loss-measurements on condenser-like objects, it appears desirable in most cases to supplement an existing standard Schering-bridge by an additional device in such a manner as to effect the balance automatically. This may be accomplished according to the invention by connecting in a suitable manner, without using the three-decade balancing condenser, an auxiliary arrangement to the bridge, which arrangement comprises the auxiliary condenser $C_H$ and the transformer T together with the corresponding connection and under given circumstances also the resistor $R_P$. To this auxiliary arrangement are then connected preferably with the aid of non-interchangeable plugs the indicating or recording devices driven by the zero motors.

Figure 9:
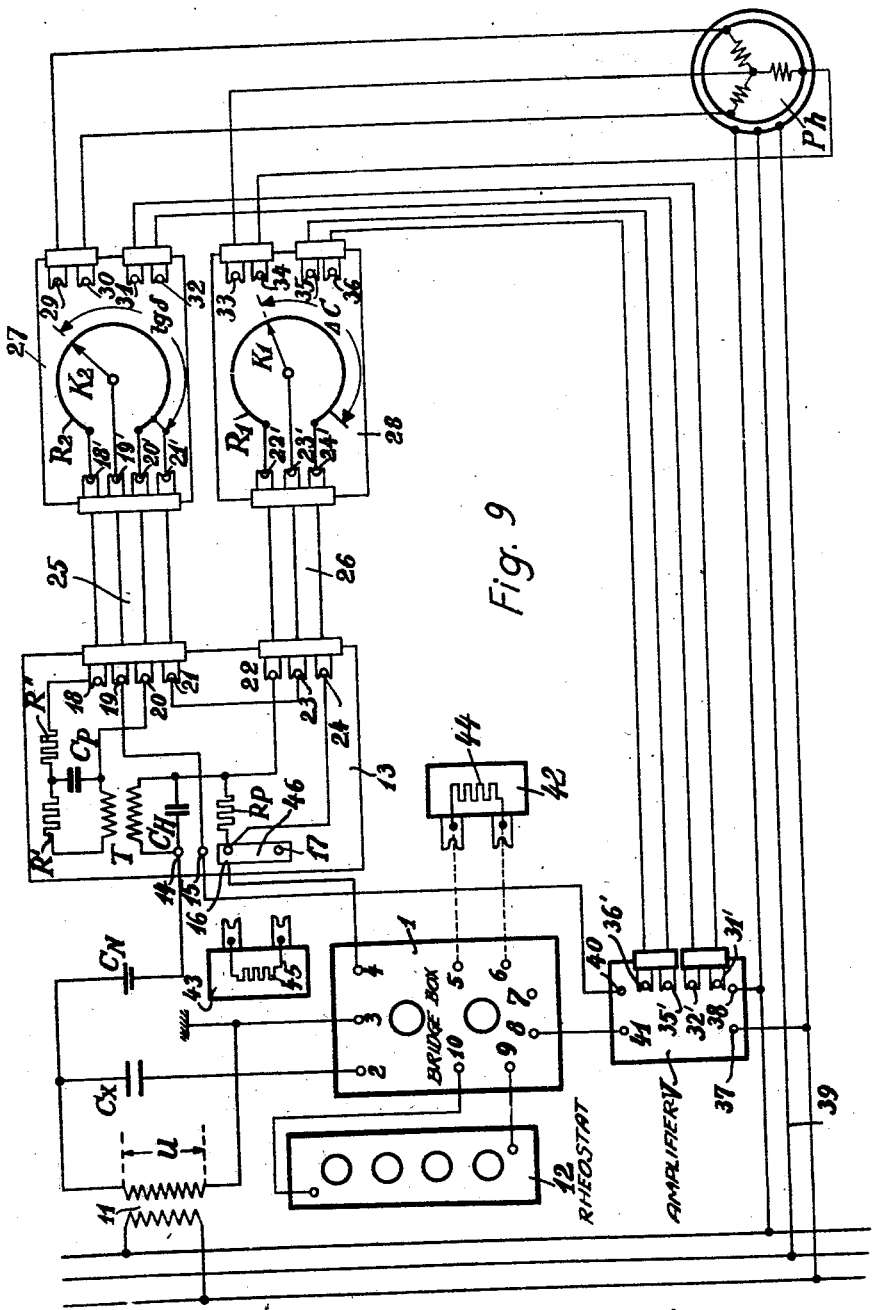
Fig. 9 represents diagrammatically the adaptation of a standard hand-balanced Schering bridge to automatic balancing according to the invention.

Such an arrangement is shown in Fig. 9, in which 1 denotes the so-called bridge box of a standard Schering-bridge. The box is provided with terminals 2 to 10. The terminals 2 and 4 serve to connect the condenser $C_x$ to be measured or the standard condenser $C_N$. The terminal 3 is connected with the grounded end of the secondary winding of the high-voltage transformer 11. When employing the bridge in the usual manner, the three-decade dial rotary type condenser is connected to the terminals 5 and 6. The terminals 7 and 8 serve in this case to connect a vibration galvanometer. To the terminals 9 and 10 is connected the four-decade rheostat 12.

For the automatic balance an auxiliary box 13 is employed according to the invention which comprises the auxiliary condenser $C_H$, the transformer T, the condenser $C_P$ and the ohmic resistors $R'$, $R''$ and $R_P$. These inner parts are connected to one another according to the connection shown in Fig. 8. The auxiliary box 13 is provided on the one hand with four terminals 14 to 17 which are connected in the manner as shown in Fig. 9 and on the other hand with seven terminals 18 to 24 which serve to connect a four-wire cable 25 and a three-wire cable 26. The cable 25 leads to an instrument 27 for indicating or recording the loss factor and the cable 26 to an instrument 28 for recording or indicating the variations of the capacity $C_x$.

The instruments 27 and 28 contain the slide wires $R_2$ and $R_1$ with the corresponding zero motors arranged and connected as shown in Fig. 8. They are provided on the one side with terminals 18' to 21' for the connection of the cable 25 and with terminals 22' to 24' for the connection of the cable 26 and on the other sides of these instruments are provided with four terminals 29 to 32 and 33 to 36 respectively. The terminals 29, 30 and 33, 34 are connected inside to the voltage windings and the terminals 31, 32 and 35, 36 to the current windings of the induction counter measuring mechanisms serving as zero motors. The terminals 29, 30, 33, 34 are connected outside according to Fig. 9 to the phase regulator $Ph$ and the terminals 31, 32, 35, 36 to the terminals 31', 32', 35', 36' of the amplifier V. The latter is furthermore provided with two terminals 37, 38 for connecting it to the supply circuit 39, and with two terminals 40, 41 which are connected to the terminals 8 and 15. Otherwise the connection is similar to that shown in Fig. 8.

The terminals 5 and 6 of the bridge box 1 as well as the terminal 7 remain at first free. However, they may be employed for connecting a small box 42 if the measuring range for indicating and recording purposes is to be extended.

To this end, an ohmic resistor 44 contained in box 42 may be connected to the terminals 5, 6 provided in the case of the standard Schering-bridge for the connection of the regulable condenser. In this manner the ohmic resistor 44 is parallel connected to the resistor $R_N$ (Fig. 8) = $1000/\pi$ = 318 ohms arranged in the bridge box and connected to the terminals 5, 6. If, for instance, the resistor 44 is also chosen = 318 ohms, the measuring range for $\Delta C$ and $tg\delta$ is extended from 0 ... 3% to 0 ... 6%. By the selection of correspondingly rated values of the parallel resistance the measuring range may be still increased. However, it is also possible to reduce the measuring range by inserting between the balancing connection and the resistance $R_N$ a suitably rated resistance 45 as a series-resistance. To this end, a plate 46 is provided as shown in Fig. 9 after the removal of which a small box 43 containing a resistor 45 may be connected to the terminals 16, 17. If, for instance, also the resistance of the resistor 45 is taken as 318 ohms a measuring range of 0 ... 1.5% is attained.

With the above-described arrangement the following procedure is preferably adopted. At the beginning of the test the bridge is so balanced as regards the ratio $C_x/C_N$ by correspondingly adjusting the resistor $R_K$ arranged in the box 12 so that the slide contact $K_1$ with the zero branch ($U_0$=0) deenergized (see Fig. 8) adjusts itself to the point of reference $O_C$ of the slide wire $R_1$; the point of reference $O_C$ may be selected at will.

In this case, the sliding contact $K_2$ assumes automatically an angular position corresponding to the resistor $r_2$ which position corresponds to the loss factor $tg\delta$ of the object $C_x$ to be tested. The tap point $O_\delta$ represents the zero point for the $tg\delta$ measurement. If now, for instance, in the case of a continuous load or of an increase in the operating voltage U, a variation of $C_x$ or of $tg\delta$ occurs, both zero motors always adjust the slide contacts controlled by the zero motors in such a manner that the zero branch remains deenergized. The pointers or recording pens coupled with the slide contacts automatically record the variation of the capacity $\Delta C$ and of the loss factor $tg\delta$ of the object to be measured in accordance with the switching-in period or with the operating voltage applied to the object to be measured, in which case the arrangement may be so designed that the time required by the recording pens to come to rest amounts only to 1 to 2 seconds. Owing to this high adjusting speed also instantaneous or sudden variations of $C_x$ and $tg\delta$ are accurately recorded.

If an indication or recording of $\Delta C$ is not necessary the corresponding balancing device must be nevertheless provided, only the indicating or recording device being omitted. Similarly the indicating or recording device coupled with the balancing resistance for $tg\delta$ could be omitted, in case only an indication or recording of $\Delta C$ should be desired.

I claim as my invention:

1. In an arrangement for measuring the losses in condenser-like objects, an alternating-current source, a bridge connection connected to said source including in one bridge branch the condenser to be measured and in an adjacent bridge branch a standard condenser and an auxiliary condenser connected in series with said standard condenser and a transformer whose primary winding is connected to said auxiliary condenser and a balancing resistor connected to the secondary winding of said transformer, a second balancing resistor inserted in the bridge branch including the condenser to be measured and a measuring device for balancing the bridge connection inserted between the tap off contacts of said two balancing resistors.

2. In an arrangement for measuring the losses in condenser-like objects, an alternating-current source, a bridge connection connected to said source including in one bridge branch the condenser to be measured and in an adjacent bridge branch a standard condenser and an auxiliary condenser connected in series with said standard condenser and a transformer whose primary winding is connected to said auxiliary condenser and a balancing resistor connected to the secondary winding of said transformer, a second balancing resistor connected to the circuit including said standard condenser and a measuring device for balancing the bridge connection being series-connected in the diagonal branch of the bridge connection to the variable parts of said two balancing resistors.

3. In an arrangement for measuring the losses in condenser-like objects, an alternating-current source, a bridge connection connected to said source including in one bridge branch the condenser to be measured and in an adjacent bridge branch a standard condenser and an auxiliary condenser connected in series with said standard condenser and a transformer whose primary winding is connected to said auxiliary condenser and a balancing resistor connected to the secondary winding of said transformer, a second balancing resistor inserted in the bridge branch including the condenser to be measured, means for displacing the current flowing in said first balancing resistor 90° out of phase with respect to the current flowing in said standard condenser and a measuring device for balancing the bridge connection inserted between the tap off contacts of said two balancing resistors.

4. In an arrangement for measuring the losses in condenser-like objects, an alternating-current source, a bridge connection connected to said source including in one bridge branch the condenser to be measured and in an adjacent bridge branch a standard condenser and an auxiliary condenser connected in series with said standard condenser and a transformer whose primary winding is connected to said auxiliary condenser and a balancing resistor connected to the secondary winding of said transformer, an ohmic resistor inserted in the circuit including said standard condenser, a second balancing resistor connected to said ohmic resistor and a measuring device for balancing the bridge connection being series-connected in the diagonal branch of the bridge connection to the variable parts of said two balancing resistors.

5. In an arrangement for measuring the losses in condenser-like objects, an alternating-current source, a bridge connection connected to said source including in one bridge branch the condenser to be measured and in an adjacent bridge branch a standard condenser and an auxiliary condenser connected in series with said standard condenser and a transformer whose primary winding is connected to said auxiliary condenser and a balancing resistor connected to the secondary winding of said transformer, a second balancing resistor connected to the circuit including said standard condenser, means for shifting the current flowing in said balancing resistor 90° out of phase with respect to the current flowing in said standard condenser, two induction counter measuring mechanisms, each of the movable members of which being coupled to one tap off contact of said two balancing resistors, a phase shifter connected to said alternating-current source for feeding the exciting windings of said induction counter measuring mechanisms with two currents 90° out of phase and an amplifier whose input circuit is connected to the diagonal branch of the bridge connection and whose output circuit serves to feed the armature windings of said two induction counter measuring mechanisms.

6. In an arrangement for measuring the losses in condenser-like objects an alternating-current source, an amplifying device, a commercial condenser measuring bridge of the Schering type connected to said alternating-current source, a standard condenser, two induction counter measuring mechanisms whose armature windings are series-connected to the input terminals of said amplifying device, two potentiometer resistors whose tap off contacts are coupled with the movable member of each of said induction counter measuring mechanisms, a phase shifter connected to said alternating-current source for feeding the exciting windings of said induction counter measuring mechanisms with two currents 90° out of phase, an auxiliary arrangement comprising an auxiliary condenser, a transformer whose primary winding is connected to said auxiliary condenser, phase shifting means connected to the secondary winding of said transformer, an ohmic resistor series-connected to the parallel-connection of said auxiliary condenser and the primary winding of said transformer, means for inserting said auxiliary transformer, the primary winding of said transformer, and said ohmic resistor in the circuit of said condenser measuring bridge including said standard condenser, means for connecting the input circuit of said amplifier to the diagonal branch of said condenser measuring bridge and means for connecting said potentiometer resistors in the manner that the tapped off parts of said both potentiometer resistors are series-connected to the diagonal points of the bridge connection.

7. In an arrangement for measuring the losses in condenser-like objects, an alternating-current source, a bridge connection connected to said source including in one bridge branch the condenser to be measured and in an adjacent bridge branch a standard condenser and an auxiliary condenser connected in series with said standard condenser and a transformer whose primary winding is connected to said auxiliary condenser, and in the bridge branch lying opposite to the condenser to be measured an ohmic resistor, a potentiometer resistor connected to the secondary winding of said transformer, a second potentiometer resistor connected to the circuit including said standard condenser, a shunt resistor for extending the measuring range, means for connecting said shunt resistor to said ohmic resistor lying opposite to the condenser to be measured and a measuring device for balancing the bridge connection being series-connected in the diagonal branch of the bridge connection to the variable parts of said two balancing resistors.

8. In an arrangement for measuring the losses in condenser-like objects, an alternating-current source, a bridge connection connected to said source including in one bridge branch the condenser to be measured and in an adjacent bridge branch a standard condenser and an auxiliary condenser connected in series with said standard condenser and a transformer whose primary winding is connected to said auxiliary condenser and in the bridge branch lying opposite to the condenser to be measured an ohmic resistor, a poteniometer resistor connected to the secondary winding of said transformer, a second potentiometer resistor connected to the circuit including said standard condenser, a series resistor for reducing the measuring range, means for inserting said series resistor in the bridge branch opposite to the condenser to be measured and a measuring device for balancing the bridge connection being series-connected in the diagonal branch of the bridge connection to the variable parts of said two balancing resistors.

WILHELM GEYGER.